(12) United States Patent
Zhang

(10) Patent No.: US 9,507,214 B2
(45) Date of Patent: Nov. 29, 2016

(54) ARRAY SUBSTRATE, DISPLAY PANEL AND METHOD FOR MANUFACTURING THE SAME

(71) Applicants: BOE TECHNOLOGY GROUP CO., LTD., Beijing (CN); BEIJING BOE DISPLAY TECHNOLOGY CO., LTD., Beijing (CN)

(72) Inventor: Hongshu Zhang, Beijing (CN)

(73) Assignees: BOE TECHNOLOGY GROUP CO., LTD. (CN); BEIJING BOE DISPLAY TECHNOLOGY CO., LTD. (CN)

( * ) Notice: Subject to any disclaimer, the term of this patent is extended or adjusted under 35 U.S.C. 154(b) by 0 days.

(21) Appl. No.: 14/519,432

(22) Filed: Oct. 21, 2014

(65) Prior Publication Data

US 2015/0355485 A1 Dec. 10, 2015

(30) Foreign Application Priority Data

Jun. 5, 2014 (CN) .......................... 2014 1 0247156

(51) Int. Cl.
*G02F 1/1339* (2006.01)
*G02B 5/08* (2006.01)
(Continued)

(52) U.S. Cl.
CPC ............. *G02F 1/1339* (2013.01); *G02B 5/021* (2013.01); *G02B 5/0284* (2013.01); *G02B 5/0891* (2013.01); *G02B 6/00* (2013.01); *G02B 6/0065* (2013.01); *G02F 1/1341* (2013.01);
(Continued)

(58) Field of Classification Search
CPC ............... G02F 1/133351; G02F 2001/13388; G02F 2001/13356; G02F 1/133567; G02F 1/153–1/1533; G02F 1/0107

USPC .......................... 349/106, 158, 160, 187, 190
See application file for complete search history.

(56) References Cited

U.S. PATENT DOCUMENTS 6,179,679 B1 * 1/2001 von Gutfeld ......... G02F 1/1339 349/190
6,323,924 B1 * 11/2001 Matsuoka ............. G02F 1/1339 349/122

(Continued)

FOREIGN PATENT DOCUMENTS

CN 2496052 Y 6/2002
CN 1447161 A 10/2003

(Continued)

OTHER PUBLICATIONS

Office Action in Chinese Patent Application No. 201410247156.X, dated Mar. 4, 2016.

(Continued)

*Primary Examiner* — Anne Hines
*Assistant Examiner* — Jose M Diaz
(74) *Attorney, Agent, or Firm* — BakerHostetler LLP1

(57) ABSTRACT

The present disclosure provides an array substrate, a display panel and a method for manufacturing the same. The array substrate includes a display region and a non-display region. The array substrate includes a glass substrate with a sealant region defined at a portion of the glass substrate corresponding to the non-display region. A plurality of light guide points is provided at the portion of the glass substrate corresponding to the non-display region. The light guide points are configured to change a direction of rays incident at a predetermined angle relative to a surface of the glass substrate and transmit the rays toward the sealant region.

16 Claims, 2 Drawing Sheets

(51) Int. Cl.
*G02F 1/1335* (2006.01)
*G02F 1/1341* (2006.01)
*G02B 5/02* (2006.01)
*G02B 6/00* (2006.01)
*F21V 8/00* (2006.01)

(52) U.S. Cl.
CPC ... *G02F1/133514* (2013.01); *G02F 1/133516* (2013.01); *G02B 6/0036* (2013.01); *G02B 6/0038* (2013.01); *G02F 2001/13415* (2013.01)

(56) References Cited

U.S. PATENT DOCUMENTS

| | | | | |
|---|---|---|---|---|
| 6,424,394 B1* | 7/2002 | Morii | ................ | G02F 1/133512 349/110 |
| 6,882,398 B2* | 4/2005 | Watanabe | ......... | G02F 1/133512 349/153 |
| 7,372,535 B2* | 5/2008 | Tashiro | ................ | G02F 1/1303 349/187 |
| 8,289,481 B2* | 10/2012 | Tashiro | ................ | G02F 1/1303 349/110 |
| 8,703,365 B2* | 4/2014 | Chen | ...................... | G02B 5/208 430/5 |
| 9,166,192 B2* | 10/2015 | Yamazaki | ........... | H01L 51/5246 |
| 2002/0196393 A1 | 12/2002 | Tashiro et al. | | |
| 2006/0012735 A1* | 1/2006 | Yamada | ................ | G02F 1/1339 349/110 |
| 2009/0196071 A1* | 8/2009 | Matheson | ............ | G02B 6/0021 362/623 |
| 2010/0134747 A1* | 6/2010 | Tashiro | ................ | G02F 1/1303 349/153 |
| 2014/0354928 A1* | 12/2014 | Kobayashi | ............ | G02F 1/1339 349/113 |

FOREIGN PATENT DOCUMENTS

| | | |
|---|---|---|
| CN | 1536404 A | 10/2004 |
| JP | 2008-233140 A | 10/2008 |
| KR | 2009-0122092 A | 11/2009 |

OTHER PUBLICATIONS

Office Action in Chinese Patent Application No. 201410247156.X, dated Aug. 17, 2016.

* cited by examiner

-Prior art-

ARRAY SUBSTRATE, DISPLAY PANEL AND METHOD FOR MANUFACTURING THE SAME

CROSS-REFERENCE TO RELATED APPLICATION

This application claims a priority of the Chinese patent application No. 201410247156.X filed on Jun. 5, 2014, which is incorporated herein by reference in its entirety.

FIELD OF THE INVENTION

The present disclosure relates to the field of display technology, in particular to an array substrate, a display panel and a method for manufacturing the same.

DESCRIPTION OF THE PRIOR ART

For the manufacture of a liquid crystal display, along with the improvement in the manufacturing process and a public demand on a narrow-bezel display panel, a bezel of the display panel becomes narrower and narrower.

FIG. 1 is a schematic view showing an existing display panel. The display panel includes an array substrate 1 and a color filter substrate 2 arranged opposite to each other, a liquid crystal layer arranged between the array substrate 1 and the color filter substrate 2, and a black matrix (BM) layer 3 arranged on the color filter substrate 2. Due to the requirement of a narrow bezel, a display region of the display panel extends to be near an edge of the color filter substrate 2, so the black matrix (BM) layer 3 is also required to extend to the edge of the color filter substrate 2 correspondingly.

In addition, in an existing process for manufacturing the liquid crystal display panel, liquid crystals in the liquid crystal layer are usually dropped onto the array substrate 1 so as to prevent drop mura (uneven dropping) occurred in a liquid crystal dropping process. Hence, as shown in FIG. 1, a sealant 4 for filling the liquid crystal molecules thereinto is formed on the array substrate 1, and then the liquid crystal molecules are dropped into a region formed by the sealant 4. Before the sealant 4 is cured, the color filter substrate 2 is arranged opposite to the array substrate 1, and after the sealant 4 is cured, the array substrate 1 is adhered to the color filter substrate 2 to form the display panel.

However, based on the above structure of the display panel and the manufacturing process therefor, if the sealant 4 is cured by irradiating it with UV light from the array substrate 1, due to the limitation of devices, it is required to turn the display panel by 90° so as to enable the array substrate 1 to face up, so the process is complex. If the sealant 4 is cured by irradiating it with the UV light from the color filter substrate 2, the light will be blocked by the black matrix (BM) layer 3 which extends to the edge of the color filter substrate 2 and thus cannot reach the sealant 4. If the sealant 4 is cured by irradiating it with the UV light from a lateral side of the display panel, the sealant 4 will be partially cured because a width of the sealant 4 is far more than its height (it usually has a height of several micrometers and a width of approximately 1 mm) and the UV light cannot reach the entire sealant 4.

Hence, there is an urgent need to improve the display panel and its manufacturing method, so as to cure the sealant completely when it is irradiated with the UV light from the lateral side of the display panel.

SUMMARY OF THE INVENTION

An object of the present disclosure is to provide an array substrate, a display panel and a method for manufacturing the same, so as to overcome such a problem in the prior art that the sealant is partially cured when it is irradiated with UV light from a lateral side of the display panel.

One embodiment of the present disclosure provides an array substrate, including a display region and a non-display region. The array substrate includes a glass substrate with a sealant region defined at a portion of the glass substrate corresponding to the non-display region. The glass substrate further includes a plurality of light guide points provided at the portion of the glass substrate corresponding to the non-display region; the light guide points are configured to change a direction of rays incident at a predetermined angle relative to a surface of the glass substrate and transmit the rays toward the sealant region. The predetermined angle is less than 90° and greater than 0°.

Optionally, the glass substrate includes a first surface and a second surface opposite to each other, the sealant region is defined on the first surface, and the light guide points are formed on the second surface.

Optionally, the light guide points are arranged at positions opposite to the sealant region.

Optionally, the light guide points are punctiform protrusions formed on the glass substrate.

Optionally, the light guide points are formed by using a printing ink process.

Optionally, the light guide points are concave grooves recessed in the glass substrate.

Optionally, the light guide points are formed by a laser machining process.

Optionally, the light guide points have diameters of 1 to 5 μm.

Optionally, the sealant region includes a first edge and a second edge opposite to each other. Distribution density values of the light guide points on the glass substrate change from a first value to a second value in a direction from the first edge to the second edge. The second value is greater than the first value. The distribution density value is a ratio of a total area of the light guide points within a predetermined region to an area of the predetermined region.

Optionally, the first value is 15%, and the second value is 30%.

Optionally, the predetermined angle is less than 25° and greater than 1°.

One embodiment of the present disclosure provides a display panel including the above-mentioned array substrate.

Optionally, the display panel further includes a color filter substrate and a liquid crystal layer arranged between the array substrate and the color filter substrate.

One embodiment of the present invention further provides a method for manufacturing the above-mentioned display panel, including the steps of:

forming a color filter substrate;

forming a plurality of light guide points on a glass substrate for forming an array substrate, and forming an electrode array layer on the glass substrate on which the light guide points are formed, thereby forming the array substrate;

coating the color filter substrate with a sealant, and dropping liquid crystals into a region defined by the sealant; and arranging the color filter substrate and the array substrate opposite to each other to form a cell, and irradiating, from one lateral side of the color filter substrate and the array substrate, a portion between the color filter substrate and the array substrate with UV light at a predetermined angle relative to a surface of the glass substrate, so as to cure the sealant.

Optionally, distribution density values of the light guide points on the glass substrate are increased in a direction from the lateral side toward an interior of the glass substrate. The distribution density value is a ratio of a total area of the light guide points in a predetermined region to an area of the predetermined region.

Optionally, the distribution density values of the light guide points on the glass substrate are increased from 15% to 30% in the direction from the side toward the interior of the glass substrate.

The above technical solution of the present disclosure at least has the following advantageous effect. By the presence of the light guide points on the glass substrate for forming the array substrate, the UV light used for curing a sealant may be transmitted to the sealant region of the array substrate so that the sealant in the entire sealant region may be irradiated by the UV light and thus cured.

DETAILED DESCRIPTION OF THE PREFERRED EMBODIMENTS

In order to make the objects, the technical solutions and the advantages of the present disclosure more apparent, the present disclosure will be described hereinafter in conjunction with the drawings and the embodiments.

Figure 1:
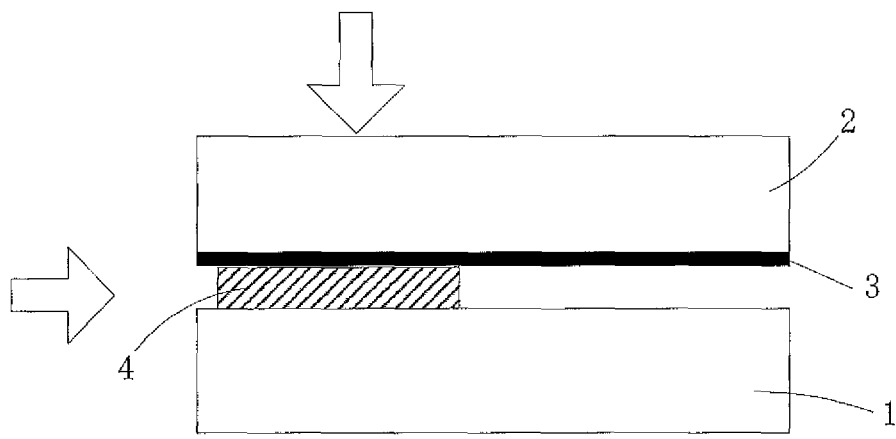
FIG. 1 is a schematic view showing a partial structure of an existing display panel.
Figure 2:
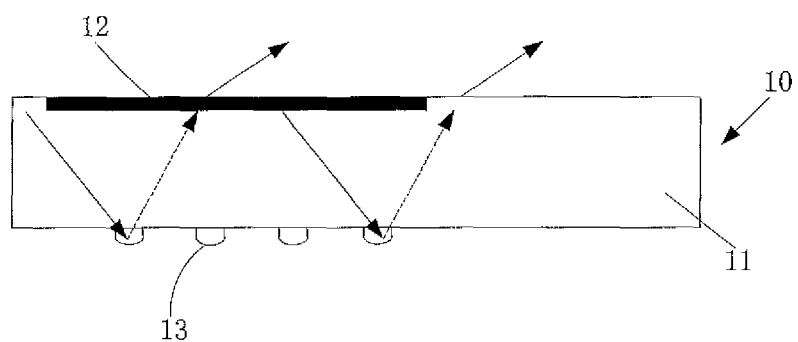
FIG. 2 is a schematic view showing a partial structure of an array substrate according to a first embodiment of the present disclosure.

FIG. 2 is a schematic view showing an array substrate 10 according to one embodiment of the present disclosure. Referring to FIG. 2, the array substrate 10 includes a display region and a non-display region. The array substrate 10 includes a glass substrate 11. A sealant region 12 is defined at a portion of the glass substrate 11 corresponding to the non-display region. That is, the sealant region 12 is provided in the non-display region of the array substrate 10. A plurality of light guide points 13 is further provided at the portion of the glass substrate 11 corresponding to the non-display region, i.e., the light guide points 13 are arranged on glass substrate 11 at the portion corresponding to the non-display region of the array substrate 10, so as to change a direction of rays incident at a predetermined angle relative to a surface of the glass substrate 11 and transmit the rays toward the sealant region 12. The predetermined angle is less than 90° and greater than 0°.

In one embodiment of the present disclosure, the light guide points 13 are arranged on the glass substrate 11 for forming the array substrate 10, and the light guide points 13 may transmit UV light used for curing a sealant to the sealant region 12 of the array substrate 10 so that the sealant in the entire sealant region 12 may be irradiated by the UV light and thus cured. It should be appreciated that, when the IN light is incident from a lateral side of the array substrate 10 at the predetermined angle which is less than 90° and greater than 0° relative to the surface of the glass substrate 11, the incident UV light may be transmitted to the light guide points 13 on the glass substrate 11, and the light guide points 13 change the direction of the incident UV light so as to transmit the UV light to the sealant region 12.

The light guide points 13 are merely used for curing the sealant, and thus the light guide points 13 may be merely arranged at corresponding positions below the sealant region 12. Specifically, the light guide points 13 are arranged at positions opposite to the sealant region 12.

In one embodiment, as shown in FIG. 2, the glass substrate 11 includes a first surface and a second surface opposite to each other. The sealant region 12 is formed on the first surface, and the light guide points 13 are formed on the second surface. Of course, the light guide points 13 are not limited to be formed on the second surface. For example, a plurality of vacuum grooves may be formed within the glass substrate 11 by a laser machining process and the vacuum grooves may also change the direction of the incident rays.

As shown in FIG. 2, the light guide points 13 may be punctiform protrusions formed on the second surface of the glass substrate 11. A cross-sectional shape of the punctiform protrusion may be a semicircular, a square or a taper. The punctiform protrusions may be formed by performing a frosting processing on the second surface, and may also be formed on the second surface of the glass substrate 11 by adopting a printing ink process. One skilled in the art should know how to use the printing ink process to form the punctiform protrusions on the glass substrate 11, and this will not be described herein.

Figure 3:
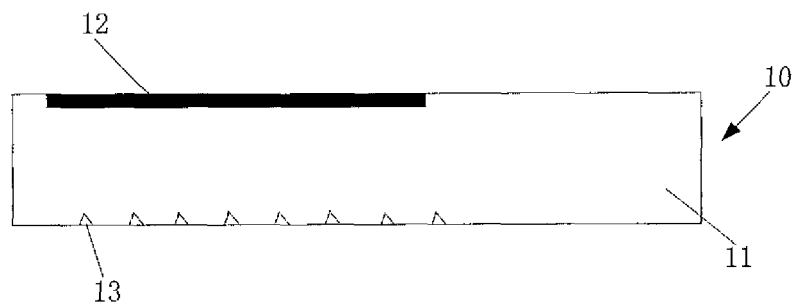
FIG. 3 is a schematic view showing a partial structure of an array substrate according to a second embodiment of the present disclosure.

In one embodiment of the present disclosure, the light guide points 13 may also be grooves recessed in the second surface of the glass substrate 11, as shown in FIG. 3. Similarly, a cross-sectional shape of the groove may be a semicircular, a square or a taper. The light guide points 13 in form of grooves recessed in the second surface may be formed by a laser machining process. One skilled in the art should know how to use the laser machining process to form the light guide points 13 having the above structures and this will not be described herein.

In the array substrate of the present disclosure, by the presence of the light guide points 13 of the above-mentioned structures on the second surface of the glass substrate 11, when the incident UV light reaches the light guide points 13, the incident UV light is refracted by curved walls of the light guide point 13 upward to the sealant region 12.

In order to make the light guide points 13 provide better reflection effect, optionally, the light guide point 13 may have a diameter of 1 to 5 μm.

Figure 4:
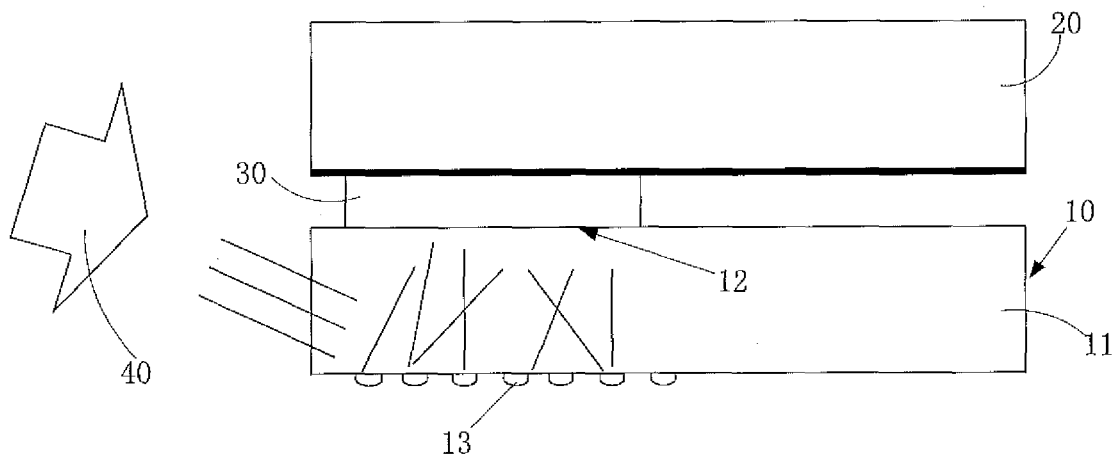
FIG. 4 is a schematic view showing a partial structure of a display panel adopting the array substrate according to the first embodiment of the present disclosure.

FIG. 4 is a schematic view showing a structure of a display panel including the array substrate according to the first embodiment of the present disclosure. As shown in FIG. 4, the display panel includes the array substrate 10 and a color filter substrate 20 arranged opposite to each other, a liquid crystal layer arranged between the array substrate 10 and the color filter substrate 20, and a sealant 30 arranged between the array substrate 10 and the color filter substrate 20. The sealant 30 is in the sealant region 12 of the array substrate 20. Liquid crystal molecules are dropped into the region defined by the sealant 30 so as to form the liquid crystal layer.

The light guide points 13 are formed on the glass substrate 11 of the array substrate 10. Specifically, the light guide points 13 may be arranged on the second surface of the glass substrate 11; the light guide points 13 may be punctiform protrusions each having a cross-sectional shape of a semi-circular, a square or a taper, or may be grooves each having a cross-sectional shape of a semicircular, a square or a taper. The light guide point 13 may have a diameter of 1 to 5 μm.

Referring to FIG. 4, when curing the sealant in the display panel of the above structures, the UV light 40 is incident at a predetermined angle from a lateral side of the display panel, and some of the UV light 40 may be transmitted to the sealant 30 while some of the UV light 40 may be transmitted to the light guide points 13 of the glass substrate 11. The light guide points 13 reflect the received light toward the sealant 30. In this way, under direct irradiation of the UV light 40 and irradiation of the light reflected by the light guide points 13 arranged below the sealant 30, the entire sealant 30 is cured completely. As a result, the problem in the existing display panel that the sealant is cured partially when being irradiated with the UV light from the lateral side of the display panel, may be overcome.

In order to completely cure the entire sealant 30, optionally, an angle of the incident UV light 40 from the lateral side of the display panel relative to a horizontal plane, i.e., a surface of the glass substrate 11, is less than 25° and greater than 1°.

Figure 5:
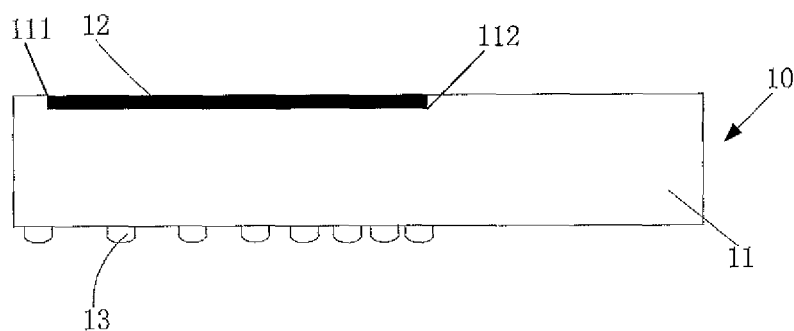
FIG. 5 is a schematic view showing distribution densities of light guide points in the array substrate.

On the other hand, in the prior art, since the UV light is incident from the lateral side of the display panel, and the sealant away from an edge of display panel receives less light than the sealant near the edge of the display panel, thus, the sealant at different regions may be cured at different levels. By adopting the array substrate of one embodiment of the present disclosure, the light guide points 13 may be merely arranged at the corresponding positions below the sealant region 12, as shown in FIG. 5, distribution density values of the light guide points 13 on the glass substrate 11 change from a first value to a second value in a direction from a first edge 111 to a second edge 112 of the sealant region 12. The second value is greater than the first value. Optionally, the first value is 15% and the second value is 30%. The distribution density value is a ratio of a total area of the light guide points 13 within a predetermined region to an area of the predetermined region.

Specifically, the first edge 111 of the sealant region 12 is an edge where the UV light is incident, and the second edge 112 is an opposite edge away from the first edge 111. Through the above-mentioned structure, the distribution densities of the light guide points 13 gradually increases in a direction from the first edge 111 to the second edge 112 as shown in FIG. 5, and the light energy reflected by the light guide points 13 also increases gradually, so as to overcome the drawback that the sealant away from the first edge 111 may receive low energy through the direct irradiation of the UV light 40. In the array substrate and the display panel of the present disclosure, by the presence of the light guide points on the glass substrate of the array substrate, when curing the sealant, the sealant may be irradiated by light incident from the lateral side of the display panel and the entire sealant may be completely cured without turning the display panel, thereby reducing the number of steps and improve the yield. In addition, since the second surface of the glass substrate is rough due to the light guide points arranged thereon, thus, a large friction may be obtained between the second surface and a contact portion of the bezel when assembling the display panel, thereby providing a firm structure.

On the other hand, one embodiment of the present disclosure further provides a method for manufacturing the above-mentioned display panel. The method includes steps of:

forming a color filter substrate;

forming a plurality of light guide points on a glass substrate used for forming an array substrate, and forming an electrode array layer on the glass substrate with the light guide points formed thereon, thereby forming the array substrate;

coating the color filter substrate with sealant, and dropping liquid crystals into a region defined by the sealant; and arranging the color filter substrate and the array substrate opposite to each other to form a cell, and irradiating, from one lateral side of the color filter substrate and the array substrate, a portion between the color filter substrate and the array substrate with UV light at a predetermined angle relative to a surface of the glass substrate, so as to cure the sealant.

Optionally, the predetermined angle is less than 10° and greater than 1°.

In the above-mentioned method, the sealant is cured by irradiating it with the UV light from the lateral side of the display panel, and the entire sealant is cured completely.

The foregoing are merely exemplary embodiments of the present disclosure. It should be appreciated that, a person skilled in the art may make further modifications and improvements without departing from the principle of the present disclosure, and these modifications and improvements shall also fall within the scope of the present disclosure.

What is claimed is:

1. An array substrate, comprising a display region and a non-display region, wherein the array substrate further comprises a glass substrate with a sealant region defined at a portion of the glass substrate corresponding to the non-display region; the glass substrate comprises a plurality of light guide points provided at the portion of the glass substrate corresponding to the non-display region; the light guide points are configured to change a direction of rays incident at a predetermined angle relative to a surface of the glass substrate and transmit the rays toward the sealant region; wherein the predetermined angle is less than 90° and greater than 0°;

wherein the sealant region comprises a first edge and a second edge opposite to each other; distribution density values of the light guide points on the glass substrate change from a first value to a second value in a direction from the first edge to the second edge; the second value is greater than the first value; and the distribution density value is a ratio of a total area of the light guide points within a predetermined region to an area of the predetermined region.

2. The array substrate according to claim 1, wherein the glass substrate comprises a first surface and a second surface opposite to each other; the sealant region is defined on the first surface, and the light guide points are formed on the second surface.

3. The array substrate according to claim 1, wherein the light guide points are arranged at positions opposite to the sealant region.

4. The array substrate according to claim 1, wherein the light guide points are punctiform protrusions formed on the glass substrate.

5. The array substrate according to claim 4, wherein the light guide points are formed by using a printing ink process.

6. The array substrate according to claim 1, wherein the light guide points are grooves recessed in the glass substrate.

7. The array substrate according to claim 6, wherein the light guide points are formed by a laser machining process.

8. The array substrate according to claim 1, wherein the light guide points have diameters of 1 to 5 µm.

9. The array substrate according to claim 1, wherein the first value is 15%, and the second value is 30%.

10. The array substrate according to claim 1, wherein the predetermined angle is less than 25° and greater than 1°.

11. A display panel comprising the array substrate according to claim 1.

12. The display panel according to claim 11, further comprising a color filter substrate and a liquid crystal layer arranged between the array substrate and the color filter substrate.

13. A method for manufacturing a display panel including an array substrate;
wherein the array substrate comprises a display region and a non-display region, wherein the array substrate further comprises a glass substrate with a sealant region defined at a portion of the glass substrate corresponding to the non-display region; the glass substrate comprises a plurality of light guide points provided at the portion of the glass substrate corresponding to the non-display region; the light guide points are configured to change a direction of rays incident at a predetermined angle relative to a surface of the glass substrate and transmit the rays toward the sealant region; wherein the predetermined angle is less than 90° and greater than 0°;
the method comprises:
forming a color filter substrate;
forming a plurality of light guide points on the glass substrate, and forming an electrode array layer on the glass substrate on which the light guide points are formed, thereby forming the array substrate;
coating the color filter substrate with a sealant, and dropping liquid crystals into a region defined by the sealant; and
arranging the color filter substrate and the array substrate opposite to each other to form a cell, and irradiating, from one lateral side of the color filter substrate and the array substrate, a portion between the color filter substrate and the array substrate with UV light at a predetermined angle relative to a surface of the glass substrate, so as to cure the sealant;
wherein distribution density values of the light guide points on the glass substrate are increased in a direction from the lateral side toward an interior of the glass substrate; and the distribution density value is a ratio of a total area of the light guide points in a predetermined region to an area of the predetermined region.

14. The method according to claim 13, wherein the predetermined angle is less than 90° and greater than 0°.

15. The method according to claim 13, wherein the predetermined angle is less than 25° and greater than 1°.

16. The method according to claim 13, wherein the distribution density values of the light guide points on the glass substrate are increased from 15% to 30% in the direction from the lateral side toward the interior of the glass substrate.

* * * * *